(12) United States Patent
Hayashi et al.

(10) Patent No.: US 11,936,985 B2
(45) Date of Patent: Mar. 19, 2024

(54) APPEARANCE INSPECTION DEVICE AND DEFECT INSPECTION METHOD

(71) Applicant: OMRON Corporation, Kyoto (JP)

(72) Inventors: Shingo Hayashi, Kyoto (JP); Daisuke Konishi, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 133 days.

(21) Appl. No.: 17/765,396

(22) PCT Filed: Mar. 10, 2020

(86) PCT No.: PCT/JP2020/010268
§ 371 (c)(1),
(2) Date: Mar. 30, 2022

(87) PCT Pub. No.: WO2021/079541
PCT Pub. Date: Apr. 29, 2021

(65) Prior Publication Data
US 2022/0360720 A1 Nov. 10, 2022

(30) Foreign Application Priority Data
Oct. 23, 2019 (JP) .................. 2019-192443

(51) Int. Cl.
*H04N 23/695* (2023.01)
*G01B 11/06* (2006.01)
(Continued)

(52) U.S. Cl.
CPC ....... *H04N 23/695* (2023.01); *G01B 11/0608* (2013.01); *G01N 21/956* (2013.01);
(Continued)

(58) Field of Classification Search
CPC .. G01B 11/0608; G01B 11/24; G01N 21/956; G01N 21/8851; G01N 2021/8854;
(Continued)

(56) References Cited

U.S. PATENT DOCUMENTS

| 2002/0024660 A1 | 2/2002 | Higashi |
| 2012/0127486 A1 | 5/2012 | Kim |

(Continued)

FOREIGN PATENT DOCUMENTS

| JP | S57208404 A | 12/1982 |
| JP | H07113620 A | 5/1995 |

(Continued)

OTHER PUBLICATIONS

International Search Report issued in Intl. Appln. No. PCT/JP2020/010268 dated Jun. 30, 2020. English translation provided.

(Continued)

*Primary Examiner* — Sherrie Hsia
(74) *Attorney, Agent, or Firm* — ROSSI, KIMMS & McDOWELL LLP

(57) ABSTRACT

Provided is a technique capable of more accurately determining a solder protruding defect in an appearance inspection device that acquires an image of an inspection region of an inspection target and measures a height of a predetermined place in the inspection region with a height measurement device. The appearance inspection device includes: an imaging unit (3); a height measurement unit (20); a moving mechanism (5) that moves the imaging unit (3) and the height measurement unit (20). When a restricted region (M) in the inspection target is irradiated with the measurement light emitted from the height measurement unit (20), the determination unit restricts defect determination based on the information on the height of the predetermined place measured by the height measurement unit (20).

11 Claims, 11 Drawing Sheets

(51) Int. Cl.
*G01N 21/88* (2006.01)
*G01N 21/956* (2006.01)

(52) U.S. Cl.
CPC .............. *G01N 2021/95646* (2013.01); *G01N 2201/1042* (2013.01)

(58) Field of Classification Search
CPC .......... G01N 2021/95669; G01N 2021/95646; G01N 2021/8887; G01N 2201/1042; H04N 23/695; G06T 7/50; G06T 7/0004
USPC .................................. 348/126, 125, 135, 142
See application file for complete search history.

(56) References Cited

U.S. PATENT DOCUMENTS

2014/0002826 A1* 1/2014 Inoue ............... G01N 21/95607
356/601

| | | | |
|---|---|---|---|
| 2014/0320633 | A1 | 10/2014 | Haugen |
| 2016/0025649 | A1 | 1/2016 | Lee |
| 2018/0328857 | A1 | 11/2018 | Lee |

FOREIGN PATENT DOCUMENTS

| | | | |
|---|---|---|---|
| JP | 2000275028 | A | 10/2000 |
| JP | 2001153616 | A | 6/2001 |
| JP | 2002039962 | A | 2/2002 |
| JP | 2006030094 | A | 2/2006 |
| JP | 2012112955 | A | 6/2012 |
| JP | 2017125861 | A | 7/2017 |

OTHER PUBLICATIONS

Written Opinion issued in Intl. Appln. No. PCT/JP2020/010268 dated Jun. 30, 2020. English translation provided.

* cited by examiner

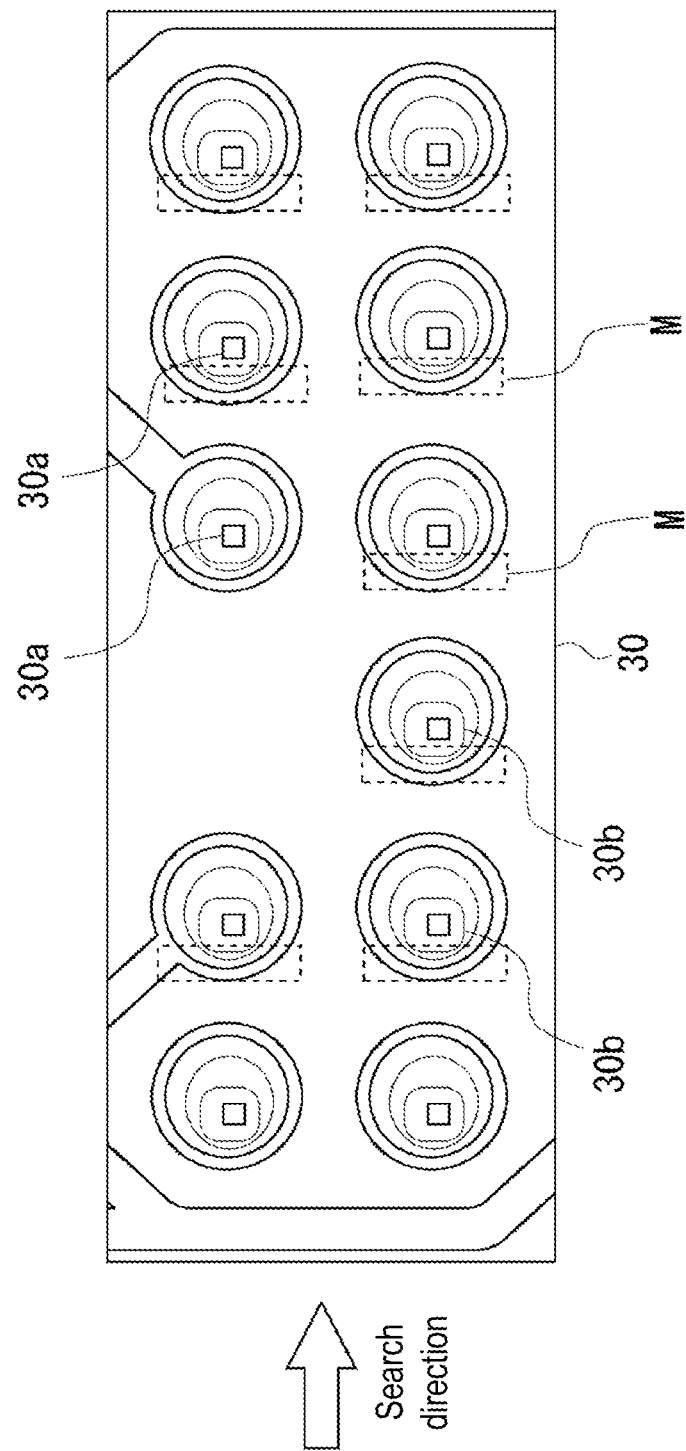

APPEARANCE INSPECTION DEVICE AND DEFECT INSPECTION METHOD

TECHNICAL FIELD

The present invention relates to an appearance inspection device that performs an appearance inspection of an inspection target in a manufacturing process or a distribution process, and a defect inspection method using the appearance inspection device.

BACKGROUND ART

An appearance inspection device that performs appearance inspection of an inspection target such as a circuit board may acquire a planar image of an inspection region in the inspection target and measure height. This is because a defect may not be detected only by the planar image of the inspection region. For example, a lead 30a of a circuit component, which is normally soldered to a circuit board 30, allows a solder fillet 30b forming a slope around the lead 30a to be formed as illustrated in FIG. 11A. In particular, soldering with an automatic machine may cause a solder protruding defect in which a solder 30c protrudes further upward from the tip of the lead 30a in a horn shape as illustrated in FIG. 11B. Such a solder protruding defect is less likely to be detected only from a planar image of the circuit board 30, and thus height of a soldered part needs to be measured.

To efficiently measure the height of the soldered part, the height of the soldered part is desirably measured in a non-contact manner using an appearance inspection device including not only an imaging device that acquires an image of the inspection region, but also a height measuring device that measures the height of the soldered part by irradiating the soldered part with measurement light and receiving reflected light of the measurement light. Height measurement as described above enables the height of the soldered part to be accurately measured when the lead 30a and the solder 30c protruding in a horn shape are irradiated with the measurement light. Unfortunately, when the slope of the solder fillet 30b is irradiated with the measurement light, reflected light of the measurement light may be further reflected by another part of the circuit board and received by the height measurement device as stray light. As a result, a solder protruding defect may be erroneously detected.

PRIOR ART DOCUMENT

Patent Document

Patent Document 1: Japanese Unexamined Patent Publication No. 2006-30094

SUMMARY OF THE INVENTION

Problems to be Solved by the Invention

The present invention is made in view of the above circumstances, and an object of the present invention is to provide a technique capable of more accurately determining a defect in an appearance inspection device that acquires an image of an inspection region of an inspection target and measures a height of a predetermined place in the inspection region.

Means for Solving the Problem

The present invention for solving the above problems is an appearance inspection device including: an imaging unit configured to capture an image of an inspection region on an inspection target; a height measurement unit configured to emit measurement light and receive reflected light of the measurement light to measure a height of a predetermined place in the inspection target; a moving mechanism configured to relatively move the imaging unit, the height measurement unit, and the inspection target to change the inspection region captured by the imaging unit and the predetermined place where the height is measured by the height measurement unit; a determination unit configured to determine whether the inspection target has a defect in the inspection region based on an image of the inspection region captured by the imaging unit and information on the height of the predetermined place measured by the height measurement unit; and a restriction unit configured to cause the determination unit to restrict determination of whether there is the defect based on the information on the height of the predetermined place measured by the height measurement unit when a predetermined restricted region in the inspection target is irradiated with the measurement light emitted from the height measurement unit.

The appearance inspection device of the present invention is basically configured such that the determination unit determines whether the inspection target has a defect in the inspection region based on the image of the inspection region, captured by the imaging unit, and the information on the height of the predetermined place measured by the height measurement unit. When the predetermined restricted region in the inspection target is irradiated with the measurement light emitted from the height measurement unit, the determination unit restricts the determination of whether there is a defect based on the information on the height of the predetermined place measured by the height measurement unit. That is, use of the information measured by the height measurement unit for the determination of whether there is a defect is restricted for a place where when the inspection target is irradiated with the measurement light, reflected light of the measurement light is not directly received by the height measurement unit and is reflected multiple times to result in being received by the height measurement unit as stray light. This configuration enables preventing erroneous detection of a defect due to the reflected light of the measurement light that is not received by the height measurement unit in a form in which the height can be measured, and that is received by the height measurement unit as stray light.

In the present invention, the inspection target may be a circuit board equipped with a circuit component, and the predetermined restricted region may include a fillet part in which solder forms a slope around a lead of the circuit component soldered to the circuit board.

This configuration restricts use of the height information acquired by the height measurement unit for determination of a defect when the measurement light is reflected in an unexpected direction by the fillet formed when the lead of the circuit component is soldered to the circuit board and is received by the height measurement unit as stray light, so that the appearance inspection device can be improved in accuracy of defect determination.

In the present invention, the inspection target may be a circuit board equipped with a circuit component, and the restricted region may include a region irradiated with the measurement light immediately before or immediately after a time point at which a lead of the circuit component soldered to the circuit board is irradiated with the measurement light when the height measurement unit and the circuit board are moved relative to each other.

When the height measurement unit measures a height of the soldered part while being moved relative to the circuit board, the fillet is irradiated with the measurement light immediately before or immediately after the time point at which the lead is irradiated with the measurement light, and then reflected light of the measurement light is likely to be received by the height measurement unit as stray light. Thus, when a restricted region, which is a region irradiated with the measurement light at the time point, is irradiated with the measurement light, it is restricted to determine whether there is a defect based on information on the height of a predetermined place measured by the height measurement unit. This configuration enables erroneous detection of a defect caused by stray light to be more reliably suppressed.

In the present invention, another lead and fillet part adjacent to the lead irradiated with the measurement light may exist in a direction in which the height measurement unit is moved relative to the circuit board from the restricted region or in a direction opposite to the direction. In other words, in addition to the conditions described above, the restricted region includes another lead and fillet part adjacent to the lead in the direction in which the height measurement unit is moved relative to the circuit board from the restricted region or in the opposite direction. In such a case, the determination unit may restrict the determination of whether there is a defect based on the information on the height of the predetermined place measured by the height measurement unit.

That is, when there is another soldered part near the soldered part including the lead irradiated with the measurement light, the measurement light reflected by the fillet in the soldered part irradiated with the measurement light is likely to be reflected again by the fillet in the adjacent soldered part and received by the height measurement unit as stray light. In such a case, when the determination unit restricts the determination of whether there is a defect based on the information on the height of the predetermined place measured by the height measurement unit, erroneous detection of a defect due to stray light can be more efficiently suppressed.

In the present invention, there may be further provided a setting unit configured to automatically set the restricted region based on a position of the lead in the circuit board.

That is, the present invention enables estimating a position where the fillet exists as long as a position of the lead is found, so that the position of the fillet may be estimated based on the position of the lead, and a region including the fillet may be automatically set as the restricted region. According to this, the restricted region can be more easily set for various circuit boards. The position of the lead in this case may be measured in advance, or may be acquired from design information on the circuit board.

In the present invention, the defect may be a solder protruding defect in which solder protrudes from a tip of the lead of the circuit component in soldering the lead to the circuit board.

The solder protruding defect is less likely to be detected from only the planar image captured by the imaging unit, and stray light caused by reflection by the fillet greatly affects accuracy of the detection of the solder protruding defect. Thus, applying the present invention to determination of the solder protruding defect enables erroneous detection of the defect to be more efficiently suppressed.

The present invention may be a defect inspection method with an appearance inspection device including: an imaging unit configured to capture an image of an inspection region on an inspection target; a height measurement unit configured to emit measurement light and receive reflected light of the measurement light to measure a height of a predetermined place in the inspection target; and a moving mechanism configured to relatively move the imaging unit, the height measurement unit, and the inspection target to change the inspection region captured by the imaging unit and the predetermined place where the height is measured by the height measurement unit, the method including: determining whether the inspection target has a defect in the inspection region based on an image of the inspection region captured by the imaging unit and information on the height of the predetermined place measured by the height measurement unit; and restricting determination of whether there is the defect based on the information on the height of the predetermined place measured by the height measurement unit when a predetermined restricted region in the inspection target is irradiated with the measurement light.

The present invention may be the defect inspection method in which the inspection target is a circuit board equipped with a circuit component, and the predetermined restricted region includes a fillet part in which solder forms a slope around a lead of the circuit component soldered to the circuit board.

The present invention may be the defect inspection method in which the inspection target is a circuit board equipped with a circuit component, and the restricted region includes a region irradiated with the measurement light immediately before or immediately after a time point at which a lead of the circuit component soldered to the circuit board is irradiated with the measurement light when the height measurement unit and the circuit board are moved relative to each other.

The present invention may be the defect inspection method in which another lead and fillet part adjacent to the lead irradiated with the measurement light exist in a direction in which the height measurement unit is moved relative to the circuit board from the restricted region or in a direction opposite to the direction.

The present invention may be the defect inspection method in which the defect is a solder protruding defect in which solder protrudes from a tip of the lead of the circuit component in soldering the lead to the circuit board.

In the present invention, means for solving the above problems can be used in combination as much as possible.

Effect of the Invention

The present invention enables improvement in accuracy of defect determination in an appearance inspection device that acquires an image of an inspection region of an inspection target and measures a height of a predetermined place in the inspection region.

BRIEF DESCRIPTION OF THE DRAWINGS

FIG. 10 is a view illustrating a second example of the substrate of the inspection target, the soldered part, and the mask region in the embodiment.

MODE FOR CARRYING OUT THE INVENTION

Application Example

Figure 1:
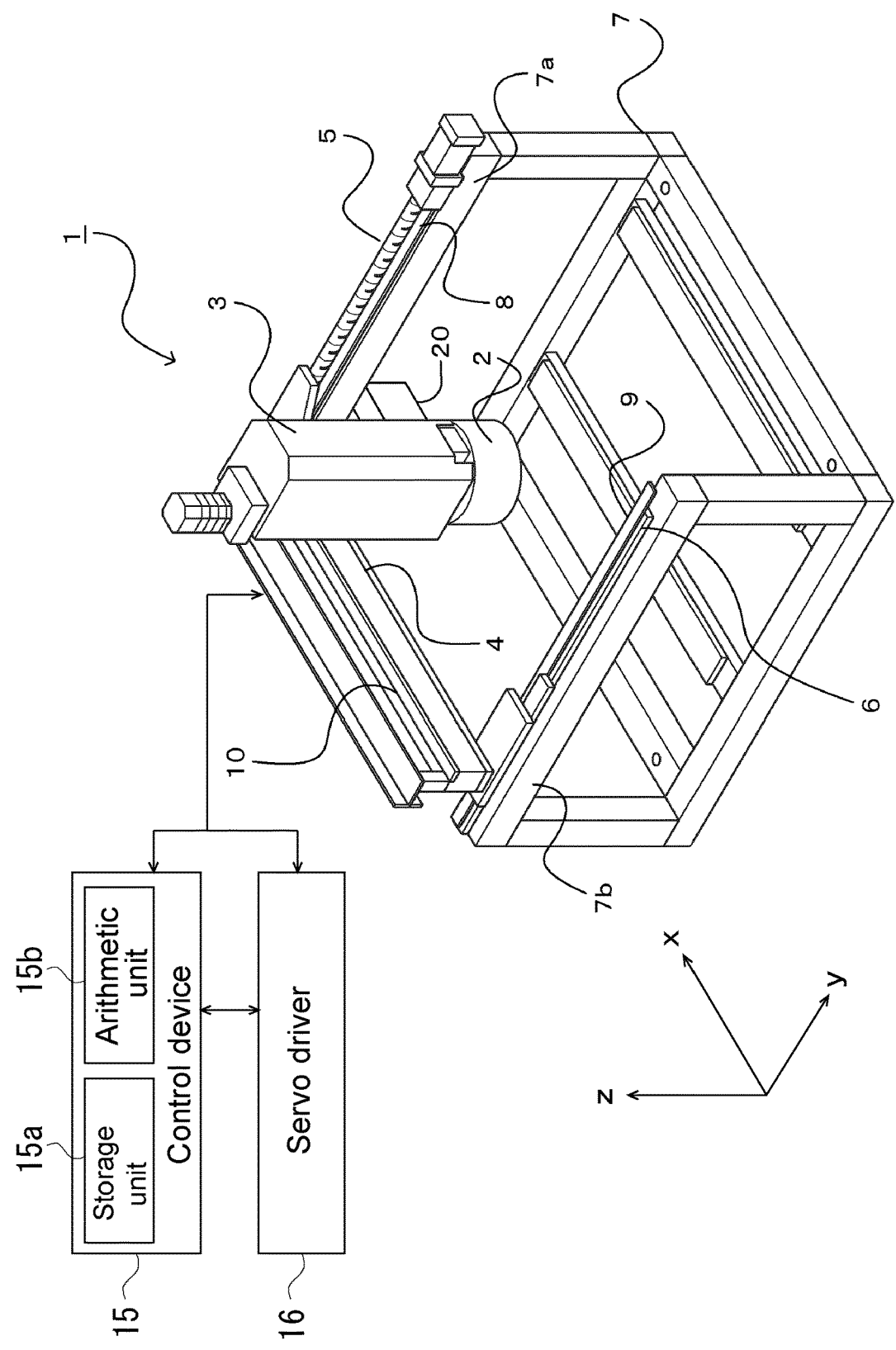
FIG. 1 is a perspective view illustrating a schematic configuration of an appearance inspection device in an application example.

Hereinafter, an appearance inspection device 1 as an application example of the present invention will be described with reference to the drawings. FIG. 1 is a perspective view illustrating a schematic configuration of a main part of the appearance inspection device 1. The appearance inspection device 1 mainly includes a mount 4 that movably supports an imaging unit 3 as an imaging unit including a camera 2 that images an inspection target in an X-axis direction, a ball screw 5 that drives the mount 4 in a Y-axis direction, a guide 6 that guides the mount 4 driven by the ball screw 5 in the Y-axis direction, and a frame 7 that supports the mount 4, the ball screw 5, and the guide 6. The frame 7 includes a ball screw support 7a that extends in the Y-axis direction and that is provided with a linear scale 8 parallel to the ball screw 5, the linear scale 8 being configured to detect a position of the mount 4.

Similarly, the frame 7 includes a guide support 7b that extends in the Y-axis direction and that is provided with a linear scale 9 parallel to a rail that guides a slider provided on the mount 4, the linear scale 9 being configured to detect a position of the mount 4. The frame 7 also includes a linear scale 10 along the mount 4 extending in the X-axis direction, the linear scale 10 being configured to detect a position of the imaging unit 3. The linear scales 8, 9, and 10 each include a part to be detected disposed along the corresponding one of the frame 7 and the mount 4, and a detection unit provided in the corresponding one of the mount 4 and the imaging unit 3. The detection unit detects position information on the part to be detected.

FIG. 1 illustrates the appearance inspection device 1 in which the imaging unit 3 is provided with the camera 2 having a downward field of view. Below the camera 2, a conveyor, which conveys a circuit board of an inspection target in the X-axis direction, is disposed. The conveyor conveys the circuit board into the appearance inspection device 1 from the outside, and the circuit board is stopped below the camera 2 and is clamped at a predetermined position. When an inspection is finished, the inspection target is conveyed by the conveyor from below the camera 2 to the outside of the appearance inspection device 1.

While the inspection target is stopped below the camera 2, the mount 4 is moved in the Y-axis direction by being driven by the ball screw 5, and the imaging unit 3 is also moved in the X-axis direction along the mount 4 by being driven by a ball screw (not illustrated). The imaging unit 3 is then moved to above an inspection position on the circuit board to capture an image of the inspection target. The imaging unit 3 captures an image of a region that corresponds to an inspection region in the embodiment. When acquisition of an image for an appearance inspection is finished, a laser displacement meter 20 as a height measurement unit then measures a height of a lead of a circuit component soldered to the circuit board to inspect the circuit component for a solder protruding defect. Although FIG. 1 illustrates only a sensor part of the laser displacement meter 20, this sensor part is also referred below to as the laser displacement meter 20.

The appearance inspection device 1 includes a control device 15, and a servo driver 16 that controls the ball screw 5 and the like of the appearance inspection device 1 in response to a command of the control device 15. The image captured by the imaging unit 3 and the information on the height detected by the laser displacement meter 20 are transmitted to the control device 15, and then an arithmetic unit 15b provided in the control device 15 performs defect determination of the solder protruding defect according to a program stored in a storage unit 15a provided in the control device 15. Here, the ball screw 5 that drives the mount 4 in the Y-axis direction and the ball screw that moves the imaging unit 3 in the X-axis direction with respect to the mount 4 each correspond to a moving mechanism in the embodiment.

Figure 2A:
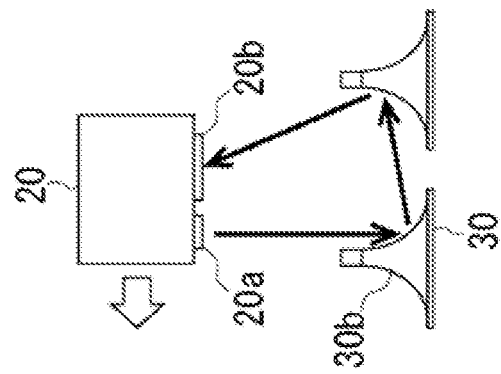
FIGS. 2A to 2C are each a diagram for illustrating a generation mechanism of stray light in the prior art.
Figure 2B:
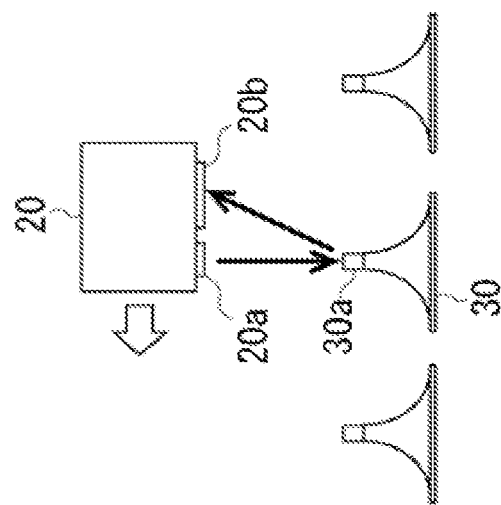
Figure 2C:
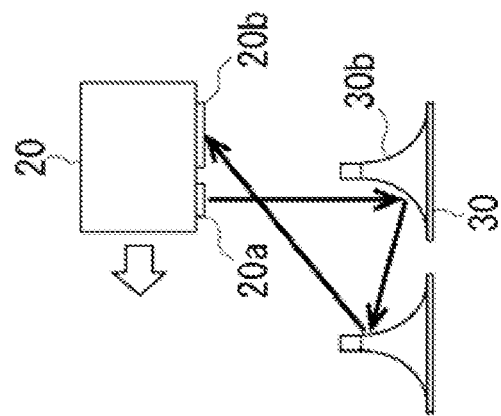

Next, an inconvenience of performing inspection for the solder protruding defect by measuring a height of a lead with the laser displacement meter 20 as described above will be described with reference to FIGS. 2A to 2C. FIGS. 2A to 2C illustrate states of reflection of laser light at individual timing when the laser displacement meter 20 performs the inspection for the solder protruding defect. FIGS. 2A to 2C each illustrate the laser displacement meter 20 that measures a height of a lead 30a of each circuit component of a circuit board 30 while being moved from the left to the right in the drawing. The laser displacement meter 20 includes a light emitting unit 20a that emits laser light vertically downward, and a light receiving unit 20b that receives reflected light from an inspection target. The light receiving unit 20b has light receiving sensitivity on a side close to the light emitting unit 20a of the laser displacement meter 20, and no light receiving sensitivity on a side opposite to the light emitting unit 20a.

FIG. 2A illustrates a state immediately after the light emitted from the light emitting unit 20a passes through the lead 30a. FIG. 2B illustrates a state in which the top of the lead 30a is irradiated with the light emitted from the light emitting unit 20a. FIG. 2C illustrates a state immediately before the top of the lead 30a is irradiated with the light emitted from the light emitting unit 20a. First, in the state of FIG. 2B, the top of the lead 30a is directly irradiated with the light emitted from the light emitting unit 20a of the laser displacement meter 20, and reflected light of the light is directly incident on the light receiving unit 20b. This state enables the height of the lead 30a to be accurately measured. Next, in the state of FIG. 2A, the top of the lead 30a is not directly irradiated with the light emitted from the light emitting unit 20a of the laser displacement meter 20, and a slope of a solder fillet 30b as a fillet part is irradiated with the light. The laser light reflected by the solder fillet 30b is then further reflected by another solder fillet 30b of another lead 30a adjacent to a front side of the solder fillet 30b, and the reflected light is incident on the light receiving unit 20b as stray light. The stray light in this state causes the laser displacement meter 20 to output a noise signal indicating a height larger than an actual height of the lead 30a.

Next, also in the state of FIG. 2C, the top of the lead 30a is not directly irradiated with the light emitted from the light emitting unit 20a of the laser displacement meter 20, and the slope of the solder fillet 30b behind the lead 30a is irradiated with the light. The laser light reflected by the solder fillet 30b is then further reflected by another solder fillet 30b of another lead 30a adjacent to a rear side of the solder fillet 30b, and the reflected light is incident on the light receiving unit 20b. This state does not cause the laser displacement meter 20 to output a noise signal caused by stray light because the light receiving unit 20b does not have sensitivity to incident light in this direction.

Figure 3:
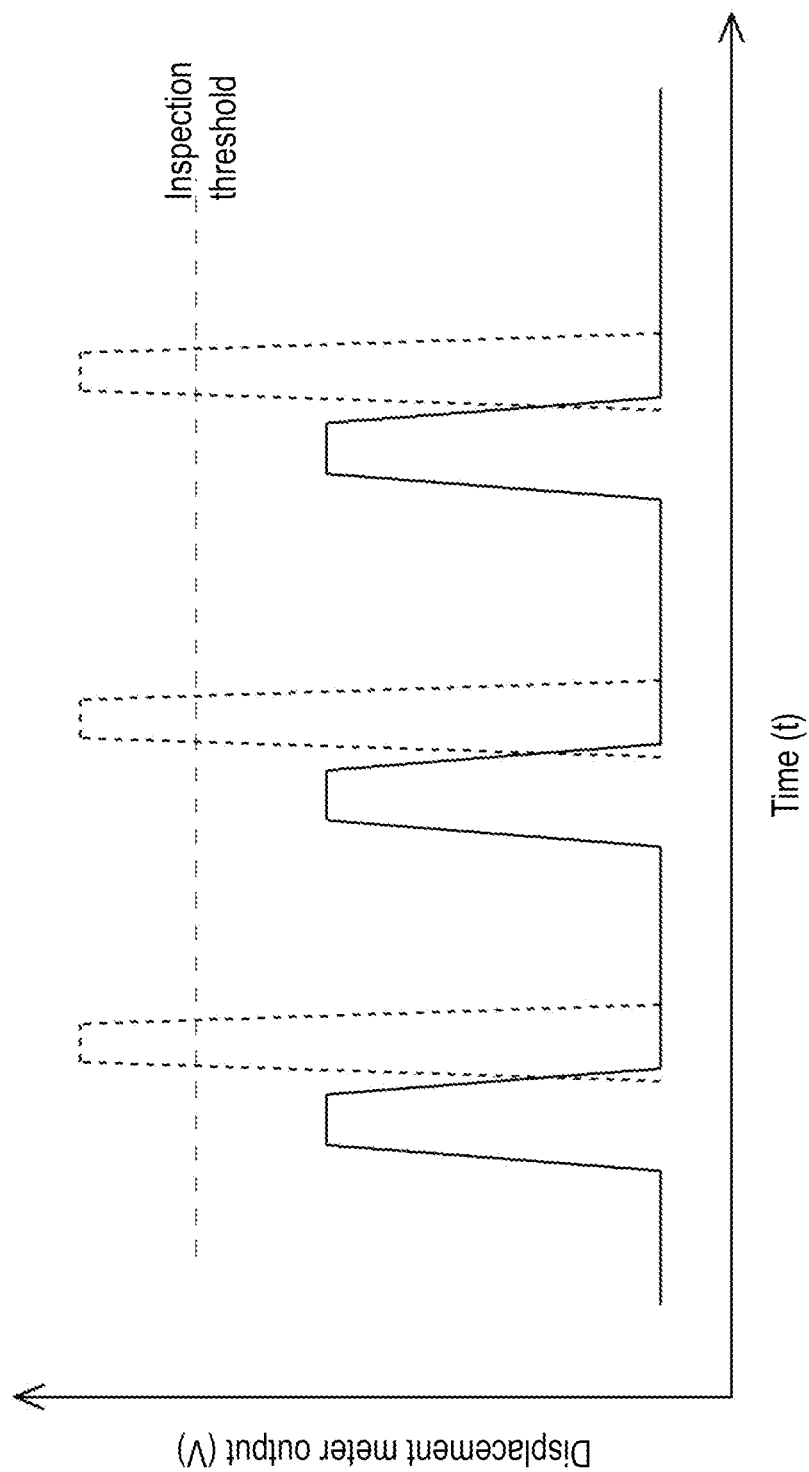
FIG. 3 is a graph showing an example of an output signal of a height measurement device obtained in the prior art.

FIG. 3 shows change in output of the laser displacement meter 20 in such a case. FIG. 3 shows a graph in which a horizontal axis represents time, and a vertical axis represents the output of the laser displacement meter 20. The graph shows a solid line that indicates an output signal based on light emitted from the laser displacement meter 20 and reflected directly from the top of the lead 30a, the output signal reflecting an actual height of the lead 30a. In contrast, a broken line indicates a noise signal caused by stray light from the solder fillet 30a of the adjacent lead 30 to a front side of the lead 30a illustrated in FIG. 2A. The graph also shows a horizontally drawn broken line that indicates an inspection threshold. When an output signal based on light applied to and reflected from the top of the lead 30a is equal to or more than this inspection threshold, it is determined that solder protrudes further upward from an upper part of the lead 30a to cause the solder protruding defect. As illustrated in FIG. 3, the noise signal is larger than the signal of the reflected light from the top of the actual lead 30a and exceeds the inspection threshold, and thus may be erroneously determined as the solder protruding defect.

Figure 4:
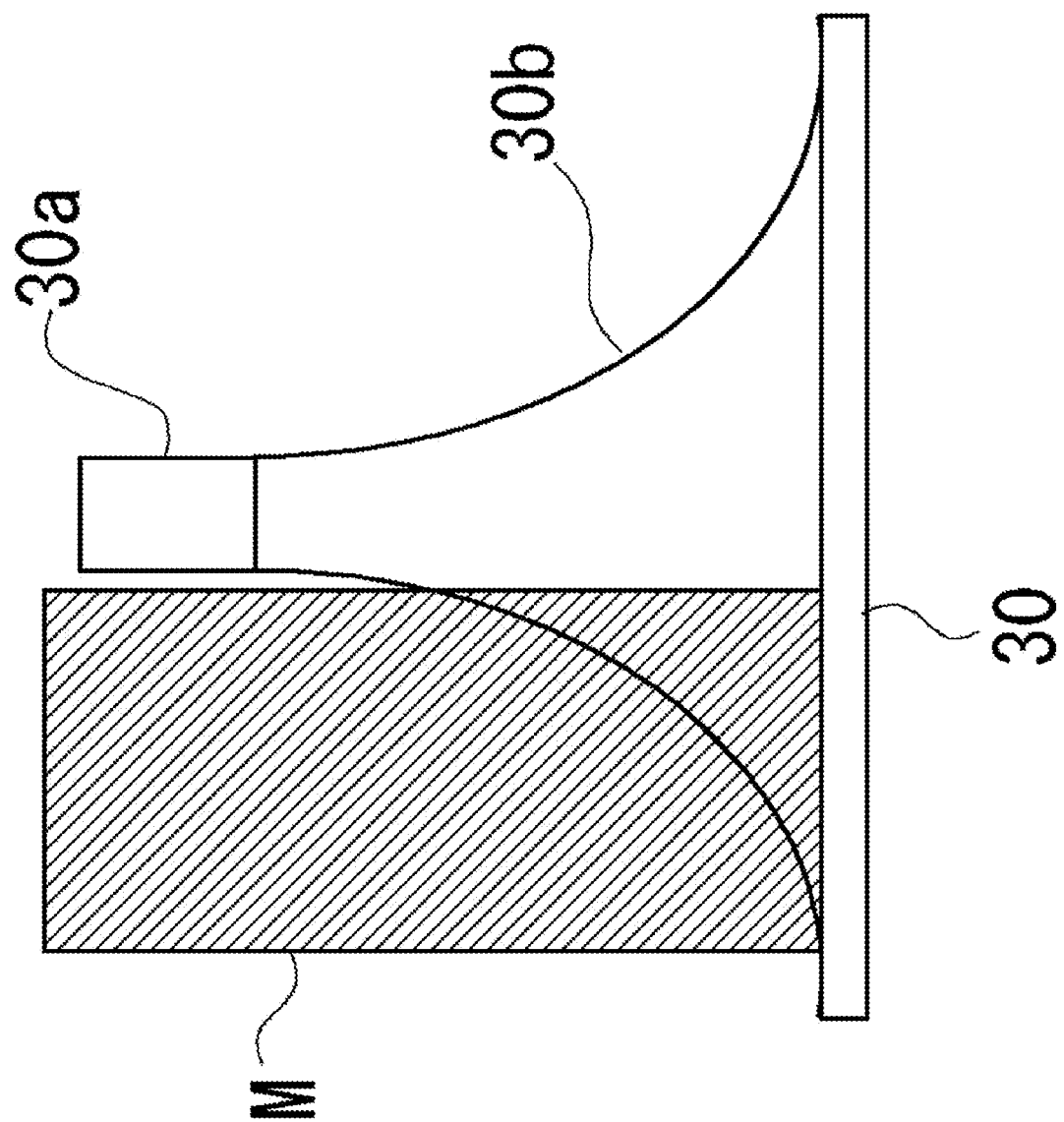
FIG. 4 is a schematic view illustrating a mask region in an application example.

In contrast, the present application example is configured to determine a solder protruding defect without using a noise signal due to stray light caused by reflection from the slope of the solder fillet 30a, the noise signal being contained in the output signal of the laser displacement meter 20. More specifically, when a mask region M as the restricted region indicated by hatching in FIG. 4 is irradiated with light emitted from the laser displacement meter 20, output of the laser displacement meter 20 is not used for determination of the solder protruding defect. This configuration enables preventing an inconvenience of erroneously determining that there is a solder protruding defect despite no solder protruding defect due to stray light caused by reflected light from the slope of the solder fillet 30b.

First Embodiment

Figure 5:
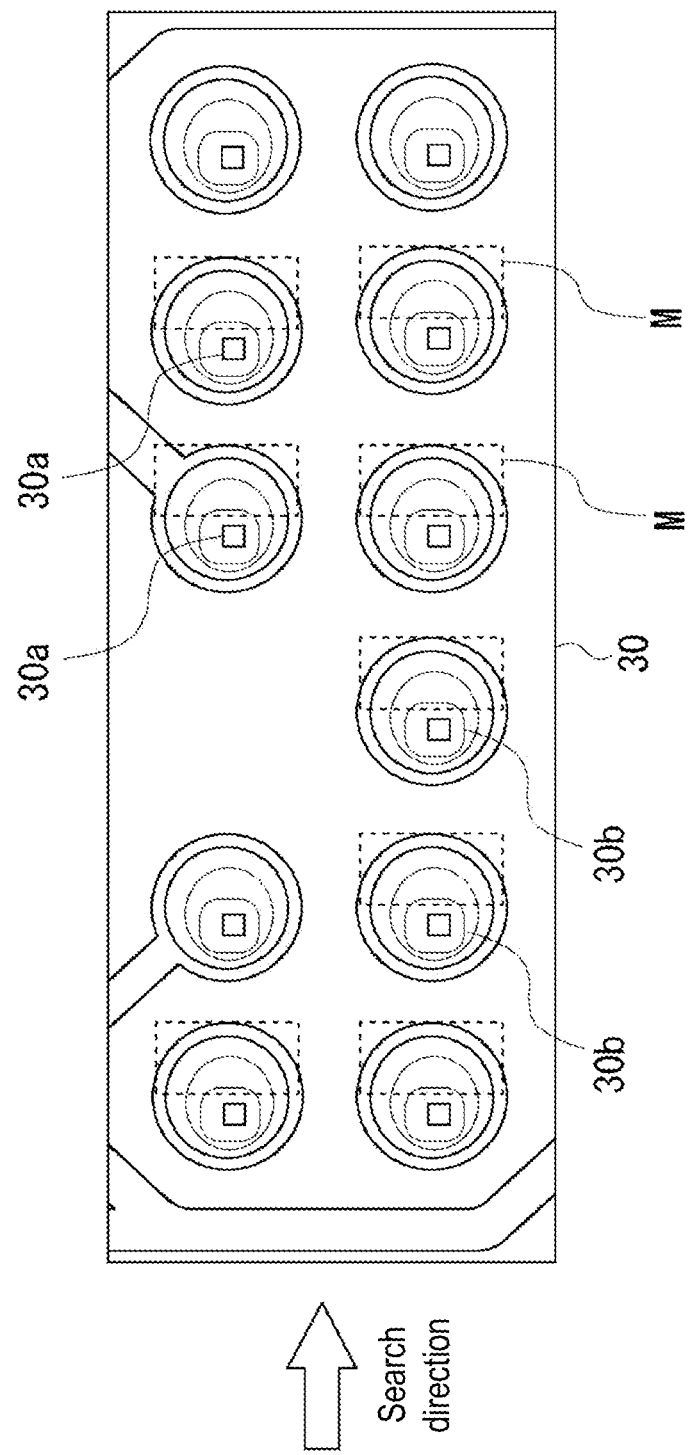
FIG. 5 is a view illustrating a substrate of an inspection target, a soldered part, and a mask region in an embodiment.

FIG. 5 is an enlarged bottom view of a part of a back surface of the circuit board 30 of an inspection target. FIG. 5 illustrates the back surface of the circuit board 30 on which the leads 30a and the solder fillets 30b formed by soldering the respective leads 30a to the circuit board 30 are disposed in two rows in parallel. In FIG. 4, the laser displacement meter 20 is to be moved from left to right. The first embodiment is configured to determine the solder protruding defect without using output of the laser displacement meter 20 when measurement light is emitted to the mask region M indicated by a broken line in a situation as illustrated in FIG. 4.

As can be seen from FIG. 5, the solder fillets 30b aligned in parallel include solder fillets 30b that are each adjacent to another solder fillet 30b in a traveling direction of the laser displacement meter 20 and to each of which the mask region M is set. This is because there is no noise output due to stray light as illustrated in FIG. 2A when another solder fillet 30b is not adjacent in the traveling direction of the laser displacement meter 20. In other words, the first embodiment is configured such that the mask region M is not set for the solder fillet 30a that is not adjacent to another solder fillet 30b in the traveling direction of the laser displacement meter 20. This configuration causes no mask region M to be set for the solder fillet 30b that is less likely to cause noise output due to stray light among the solder fillets 30b, thus enabling more detailed height measurement to be performed.

Figure 6:
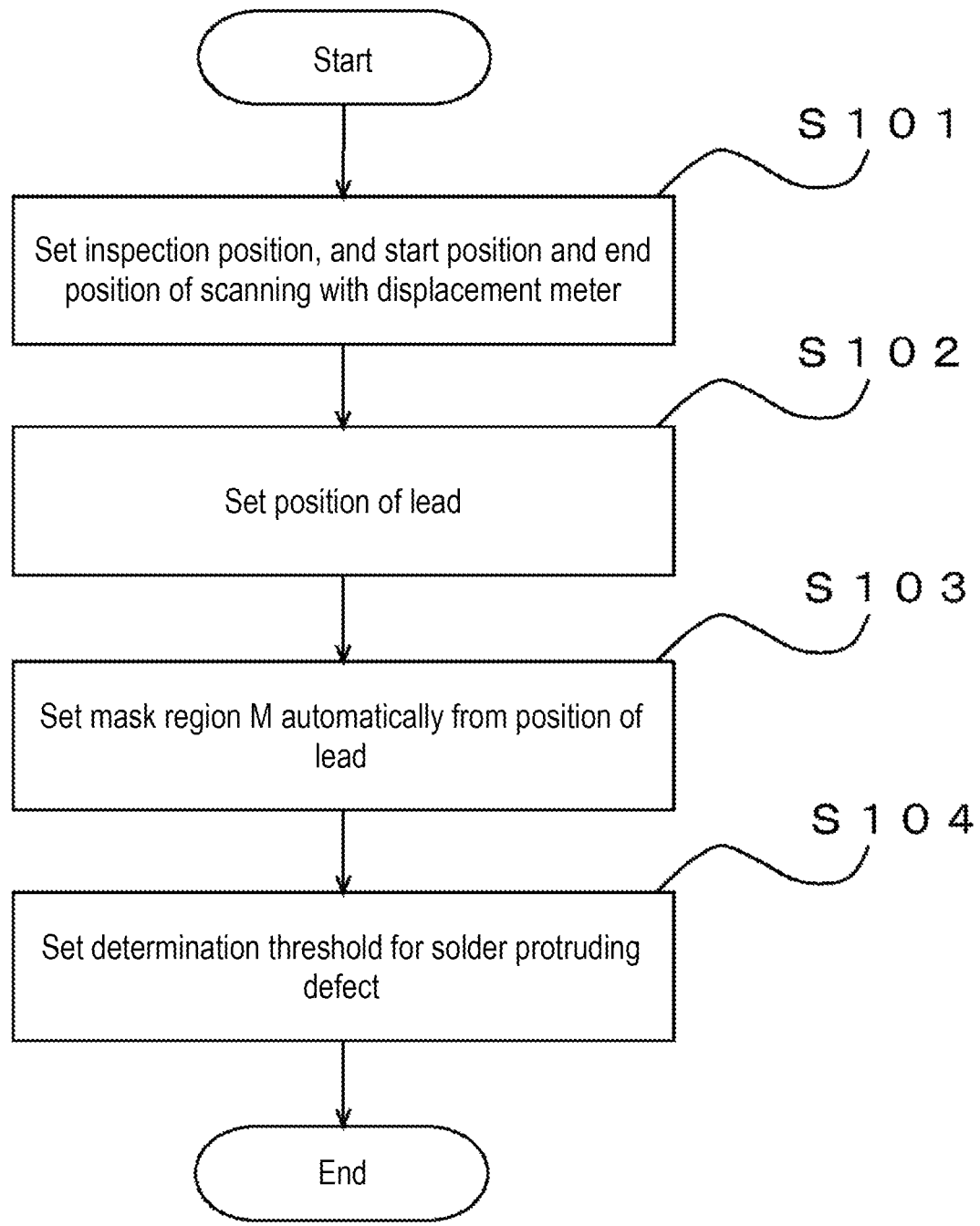
FIG. 6 is a flowchart illustrating a setting flow for defect inspection in the embodiment.

Next, control related to determination of the solder protruding defect will be described with reference to FIGS. 6 and 7. FIG. 5 illustrates a flowchart related to various setting steps in the determination of the solder protruding defect. This flowchart is stored in the storage unit 15a in the control device 15 and performed by the arithmetic unit 15b. In step S101, this flow is first performed to set an inspection position on the circuit board 30 of an inspection target, and a start position and an end position of scanning with the laser displacement meter 20. Next, in step S102, a position of a connection hole of the lead 30a in the circuit board 30 is acquired from design information on the circuit board 30 to set a position of the lead 30a.

Next, in step S103, a position of the mask region M is automatically set from the position of the lead 30a. More specifically, the position of the mask region M may be set within a range of 0.1 mm to 1 mm from the position of the lead 30a in the traveling direction of the laser displacement meter 20, and within a range of ±1 mm from the center of the lead 30a in a direction perpendicular to the traveling direction of the laser displacement meter 20, for example. The position (range) of the mask region M may be determined in accordance with a thickness of the lead 30a and a size of the solder fillet 30b. Next, in step S104, a determination threshold for the solder protruding defect is determined. This determination threshold is set to a value larger than a maximum value of variation in height of the lead 30a without the solder protruding defect and smaller than a minimum value of variation in height of a solder tip with the solder protruding defect. When processing in step S104 ends, this routine ends. Here, the arithmetic unit 15b of the control device 15 that performs step S103 of automatically setting the mask region M corresponds to a setting unit in the first embodiment.

Figure 7:
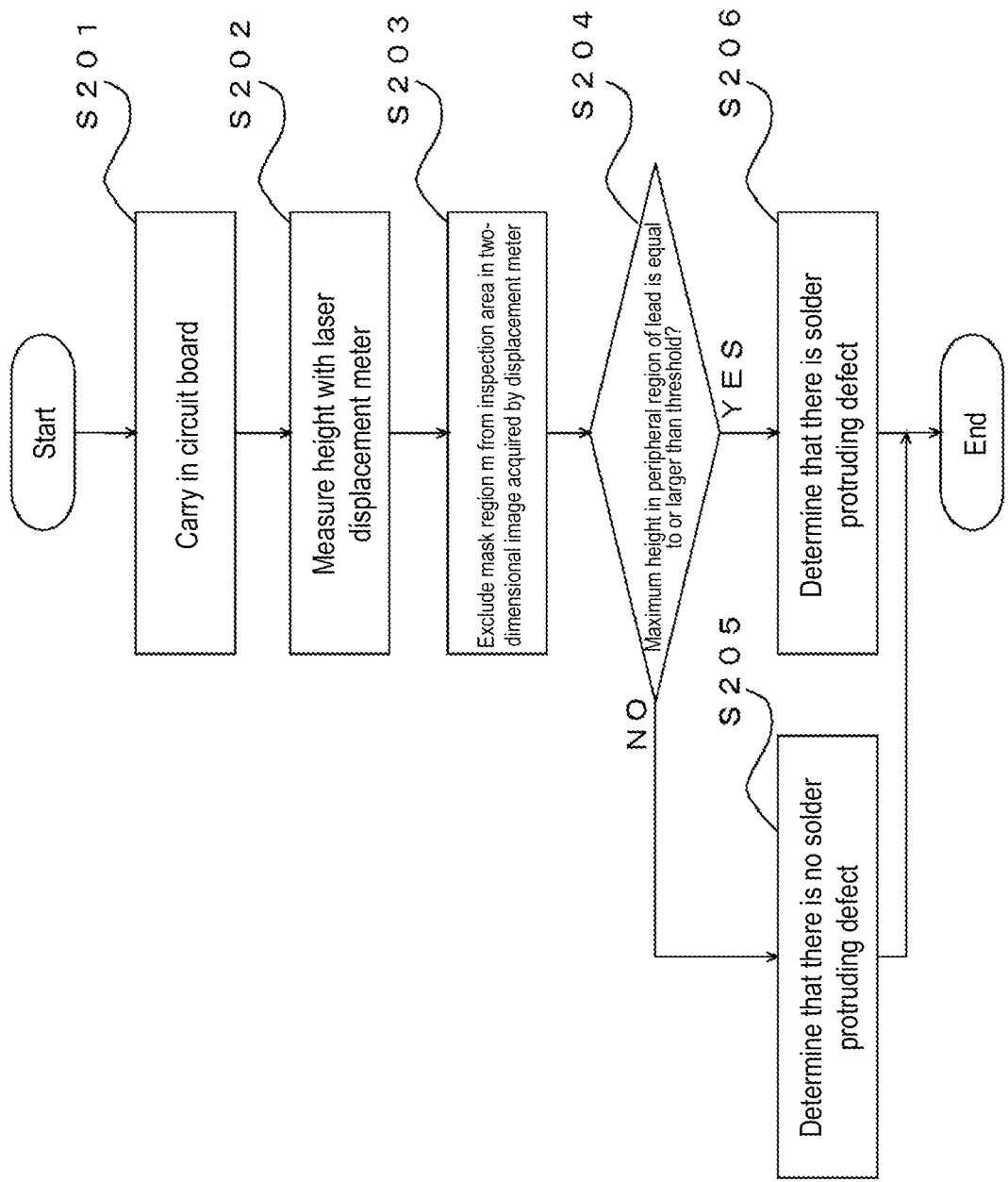
FIG. 7 is a flowchart illustrating a defect inspection flow in the embodiment.

Next, FIG. 7 illustrates a flowchart of a determination routine of the solder protruding defect. When this routine is performed, in step S201, the circuit board 30 as an inspection target is first carried into the appearance inspection device 1. Next, in step S202, the laser displacement meter 20 measures a height of the lead 30a of a soldered part (in practice, before this, the imaging unit 3 captures an image of an appearance of each inspection region on the circuit board 30). Next, in step S203, the mask region M is excluded from an inspection area of a two-dimensional image acquired by the laser displacement meter 20. More specifically, although the laser displacement meter 20 performs the height measurement also for the mask region M, information on the height obtained from this region is not used for the determination of the solder protruding defect.

Then, the processing proceeds to step S204 to determine whether a maximum height in a peripheral region of the lead 30 is equal to or larger than the inspection threshold set in step S104. At this time, the mask region M is excluded from the peripheral region. The peripheral region of the lead 30 corresponds to a predetermined place in the first embodiment. Here, when the maximum height of the lead 30 in the peripheral region (excluding the mask region M) is smaller than the inspection threshold set in step S104, the processing proceeds to step S205. In contrast, when the maximum height of the lead 30 in the peripheral region (excluding the mask region M) is equal to or larger than the inspection threshold value set in step S104, the processing proceeds to step S206.

In step S205, it is determined that there is no solder protruding defect. In contrast, in step S206, it is determined that there is the solder protruding defect. When processing in step S205 or step S206 ends, this routine ends.

As described above, according to the first embodiment, information on the measured height is not used for the determination of the solder protruding defect in the region where the measurement light from the laser displacement meter 20 is reflected by the solder fillet 30b to become stray light and may be received by the laser displacement meter 20. This configuration enables suppressing occurrence of erroneous determination in the determination of the solder protruding defect. Here, the arithmetic unit 15b of the control device 15, performing the processing in step S203 of excluding the mask region M from the inspection area of the two-dimensional image acquired by the laser displacement meter 20, corresponds to a restriction unit in the first embodiment. The arithmetic unit 15b of the control device 15, performing the processing of steps S204 to S206, corresponds to a determination unit in the first embodiment.

Figure 8:
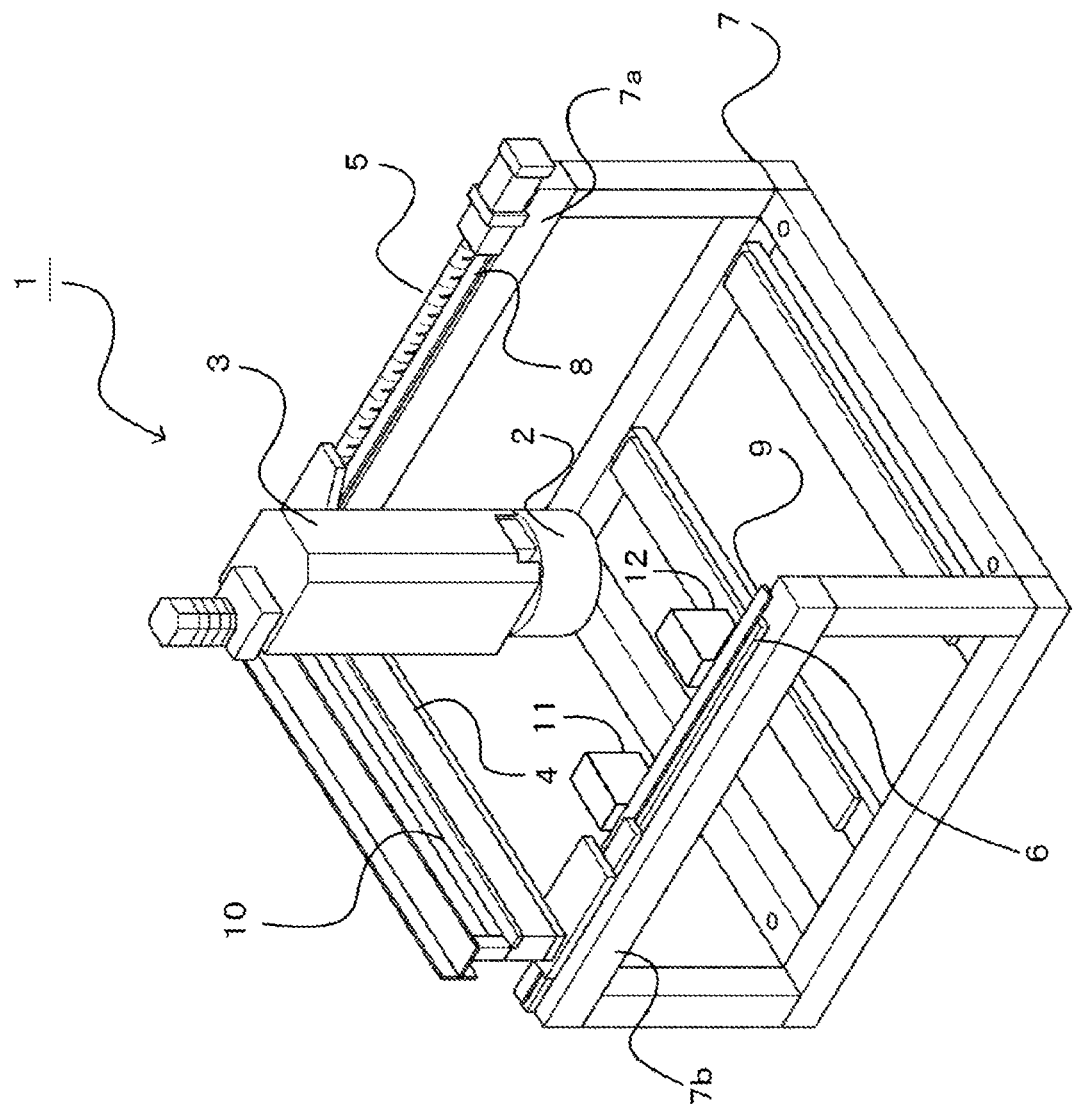
FIG. 8 is a perspective view illustrating a schematic configuration of another example of the appearance inspection device to which the actual invention is applied.

Although the first embodiment is described in which the laser displacement meter 20 is fixed to the imaging unit 3 of the appearance inspection device 1, and the imaging unit 3 is moved to measure a height at an inspection place of the circuit board 30 of an inspection target as illustrated in FIG. 1, the appearance inspection device 1 to which the present invention is applied is not limited to the configuration illustrated in FIG. 1. For example, the present invention may be applied to a configuration in which laser displacement meters 11 and 12 are provided in the guide support 7b of the appearance inspection device 1 as illustrated in FIG. 8 to measure a height at an inspection place of the circuit board 30 when the circuit board 30 is carried into the appearance inspection device 1.

Figure 9A:
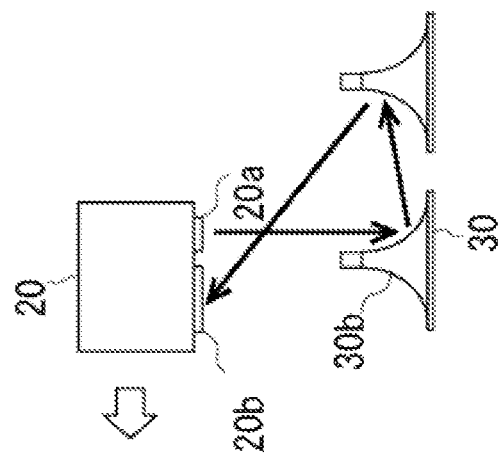
FIGS. 9A to 9C are each a diagram for illustrating a second example of the generation mechanism of stray light in the prior art.
Figure 9B:
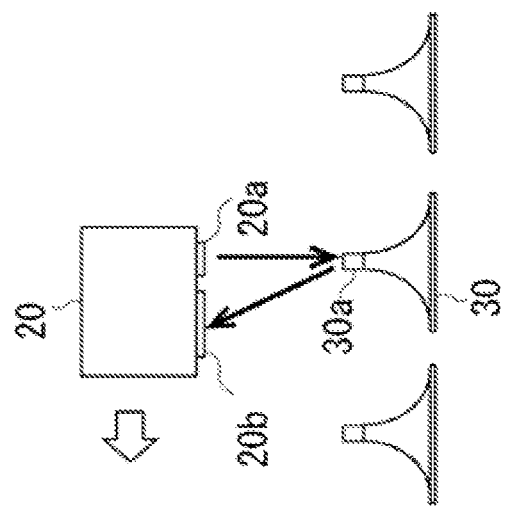
Figure 9C:
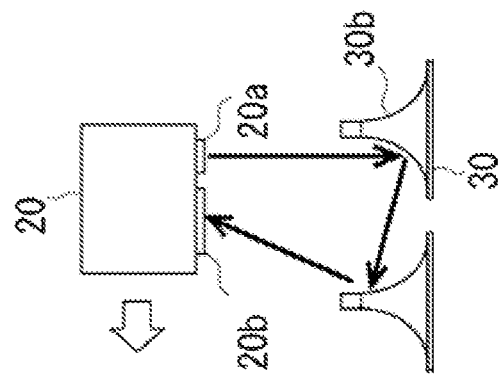
Figure 11B:
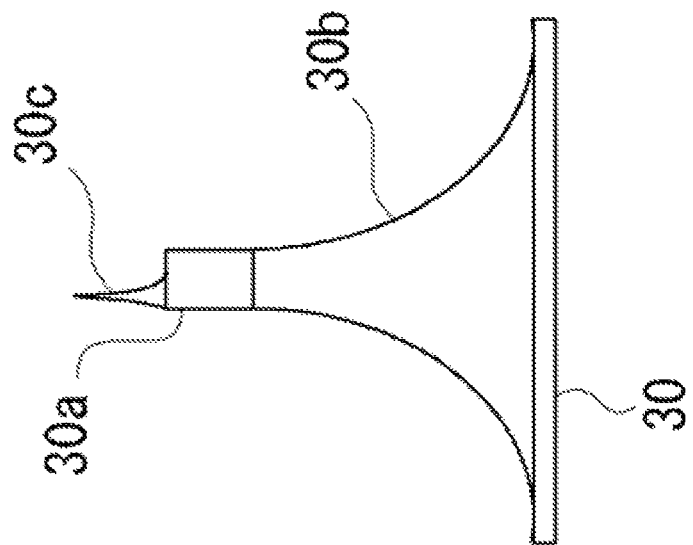
FIGS. 11A and 11B are each a diagram for illustrating a solder protruding defect in the actual invention.
Figure 11A:
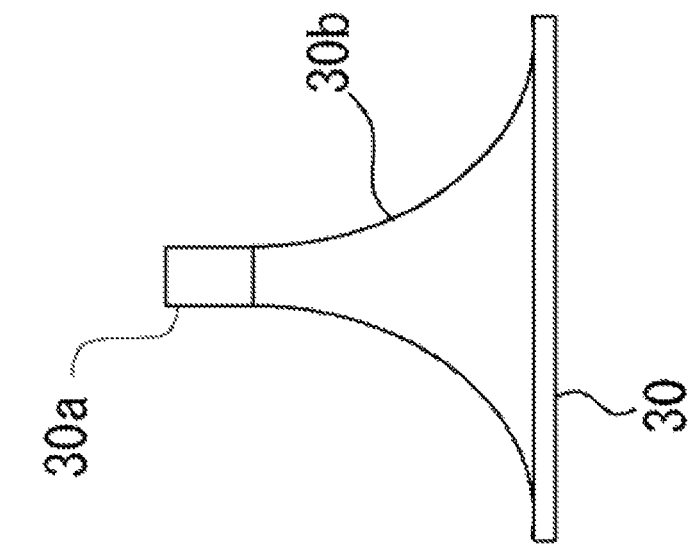

The first embodiment describes an example in which the laser displacement meter 20 includes probes in which the light emitting unit 20a is disposed on a front side of the light receiving unit 20b in the traveling direction of the laser displacement meter 20 as illustrated in FIGS. 2A to 2C. However, placement of the laser displacement meter 20 to which the present invention is applied is not limited to the above placement. The present invention is also applicable to a device in which the light emitting unit 20a is disposed behind the light receiving unit 20b in the traveling direction of the laser displacement meter 20. The device will be described with reference to FIGS. 9A to 9C in which the light emitting unit 20a is disposed behind the light receiving unit 20b in the traveling direction of the laser displacement meter 20. FIGS. 9A to 9C illustrate states of reflection of laser light at individual timing when the laser displacement meter 20 performs inspection for the solder protruding defect in the device.

As with FIG. 2A, FIG. 9A illustrates a state immediately after the light emitted from the light emitting unit 20a passes through the lead 30a. FIG. 9B illustrates a state in which the top of the lead 30a is irradiated with the light emitted from the light emitting unit 20a. FIG. 9C illustrates a state immediately before the top of the lead 30a is irradiated with the light emitted from the light emitting unit 20a. In the state of FIG. 9B, the top of the lead 30a is directly irradiated with the light emitted from the light emitting unit 20a of the laser displacement meter 20, and reflected light of the light is directly incident on the light receiving unit 20b. Next, in the state of FIG. 9A, the slope of the solder fillet 30b is irradiated with the light emitted from the light emitting unit 20a of the laser displacement meter 20. The laser light reflected by the solder fillet 30b is then further reflected by another solder fillet 30b of another lead 30a adjacent to a front side of the solder fillet 30b, and the reflected light is incident on the light receiving unit 20b as stray light. This state does not cause the laser displacement meter 20 to output a noise signal caused by stray light because the light receiving unit 20b does not have sensitivity to incident light in this direction.

Next, also in the state of FIG. 9C, the top of the lead 30a is not directly irradiated with the light emitted from the light emitting unit 20a of the laser displacement meter 20, and the slope of the solder fillet 30b behind the lead 30a is irradiated with the light. The laser light reflected by the solder fillet 30b is then further reflected by another solder fillet 30b of another lead 30a adjacent to a rear side of the solder fillet 30b, and the reflected light is incident on the light receiving unit 20b. The stray light in this state causes the laser displacement meter 20 to output a noise signal indicating a height larger than an actual height of the lead 30a.

Thus, when the light emitting unit 20a is disposed behind the light receiving unit 20b in the traveling direction of the laser displacement meter 20, the mask region M may be set to a region irradiated immediately before the lead 30a is irradiated with the measurement light of the laser displacement meter 20 as illustrated in FIG. 10.

The present invention is also applicable to a device in which the light emitting unit 20a and the light receiving unit 20b are disposed perpendicularly to the traveling direction of the laser displacement meter 20. In this case, the measurement light reflected by the solder fillet 30b may be incident on the light receiving unit 20b as stray light in both a state immediately after the light emitted from the light emitting unit 20a passes through the lead 30a and a state immediately before the top of the lead 30a is irradiated with the light emitted from the light emitting unit 20a. Thus, the mask region M in this case may be set to both a region to be irradiated immediately before the lead 30a is irradiated with the measurement light of the laser displacement meter 20 and a region to be irradiated immediately after the lead 30a is irradiated with the measurement light of the laser displacement meter 20. The region to be irradiated immediately before the lead 30a is irradiated with the measurement light of the laser displacement meter 20 and the region to be irradiated immediately after the lead 30a is irradiated with the measurement light of the laser displacement meter 20 in the first embodiment may be each, for example, within a range of 0.1 mm to 1 mm from the position of the lead 30a in the traveling direction of the laser displacement meter 20 or a direction opposite to the traveling direction as described above.

In the above first embodiment, the mask region M is excluded from the inspection area of the two-dimensional image acquired by the laser displacement meter 20. More specifically, although the laser displacement meter 20 performs the height measurement also for the mask region M, information on the height obtained from this region is not used for the determination of the solder protruding defect. However, setting of the mask region M in the present invention is not limited thereto. For example, the laser displacement meter 20 may perform no height measurement for the mask region M. Alternatively, for the mask region M, information on height measured by the laser displacement meter 20 may be uniformly set to a value clearly lower than the height of the lead 30a. Additionally, for the mask region M, the information on height measured by the laser displacement meter 20 may be multiplied by a predetermined coefficient (e.g., a coefficient of 1 or less, such as that multiplied by 0.1). These processes correspond to "the determination unit restricts the determination of whether there is a defect based on the information on the height of the predetermined place measured by the height measurement unit" in the first embodiment.

In the above first embodiment, the circuit board 30 of an inspection target is fixed in the appearance inspection device 1, and the imaging unit 3 and the laser displacement meter 20 are moved to relatively move the imaging unit 3 and the laser displacement meter 20 with respect to the circuit board 30. However, the appearance inspection device to which the present invention is applied may be configured such that the imaging unit 3 and the laser displacement meter 20 are fixed and an inspection target is moved to relatively move the imaging unit 3 and the laser displacement meter 20 with respect to the inspection target.

To enable comparison between the constituent elements of the present invention and the configurations of the embodiment, the constituent elements of the present invention will be described below with reference signs in the drawings.

<First Aspect of Invention>

A first aspect of the invention is an appearance inspection device (1) including:
  an imaging unit (3) configured to capture an image of an inspection region on an inspection target (30);
  a height measurement unit (20) configured to emit measurement light and receive reflected light of the measurement light to measure a height of a predetermined place in the inspection target;
  a moving mechanism (5) configured to relatively move the imaging unit (3), the height measurement unit (20), and the inspection target to change the inspection region captured by the imaging unit (3) and the predetermined place where the height is measured by the height measurement unit (20);
  a determination unit (15) configured to determine whether the inspection target has a defect in the inspection region based on an image of the inspection region captured by the imaging unit (3) and information on the height of the predetermined place measured by the height measurement unit (20); and
  a restriction unit (15) configured to cause the determination unit to restrict determination of whether there is the defect based on the information on the height of the predetermined place measured by the height measurement unit (20) when a predetermined restricted region (M) in the inspection target is irradiated with the measurement light emitted from the height measurement unit (20).

<Seventh Aspect of Invention>

A seventh aspect of the invention is a defect inspection method using an appearance inspection device (1) including:
  an imaging unit (3) configured to capture an image of an inspection region on an inspection target;
  a height measurement unit (20) configured to emit measurement light and receive reflected light of the measurement light to measure a height of a predetermined place in the inspection target; and
  a moving mechanism (5) configured to relatively move the imaging unit (3), the height measurement unit (20), and the inspection target to change the inspection region captured by the imaging unit (3) and the predetermined place where the height is measured by the height measurement unit, the method including:
  determining whether the inspection target has a defect in the inspection region based on an image of the inspection region captured by the imaging unit (3) and information on the height of the predetermined place measured by the height measurement unit (20); and
  restricting determination of whether there is the defect based on the information on the height of the predetermined place measured by the height measurement unit (20) when a predetermined restricted region (M) in the inspection target is irradiated with the measurement light.

DESCRIPTION OF SYMBOLS 1 appearance inspection device
2 camera
3 imaging unit
8, 9, 10 linear scale
15 control device
16 servo driver
20 laser displacement meter
30 circuit board
30a lead
30b fillet
30c solder protruding defect
M mask region

The invention claimed is:

1. An appearance inspection device comprising:
  an imaging unit configured to capture an image of an inspection region on an inspection target;
  a height measurement unit configured to emit measurement light and receive reflected light of the measurement light to measure a height of a predetermined place in the inspection target;
  a moving mechanism configured to relatively move the imaging unit, the height measurement unit, and the inspection target to change the inspection region captured by the imaging unit and the predetermined place where the height is measured by the height measurement unit;
  a determination unit configured to determine whether the inspection target has a defect in the inspection region based on an image of the inspection region captured by the imaging unit and information on the height of the predetermined place measured by the height measurement unit; and
  a restriction unit configured to cause the determination unit to restrict determination of whether there is the defect based on the information on the height of the predetermined place measured by the height measurement unit when a predetermined restricted region in the inspection target is irradiated with the measurement light emitted from the height measurement unit.

2. The appearance inspection device according to claim 1, wherein
  the inspection target is a circuit board equipped with a circuit component, and
  the restricted region comprises a fillet part in which solder forms a slope around a lead of the circuit component soldered to the circuit board.

3. The appearance inspection device according to claim 2, wherein
  another lead and fillet part adjacent to the lead irradiated with the measurement light exist in a direction in which the height measurement unit is moved relative to the circuit board from the restricted region or in a direction opposite to the direction.

4. The appearance inspection device according to claim 2, further comprising
a setting unit configured to automatically set the restricted region based on a position of the lead in the circuit board.

5. The appearance inspection device according to claim 1, wherein
the inspection target is a circuit board equipped with a circuit component, and
the restricted region comprises a region irradiated with the measurement light immediately before or immediately after a time point at which a lead of the circuit component soldered to the circuit board is irradiated with the measurement light when the height measurement unit and the circuit board are moved relative to each other.

6. The appearance inspection device according to claim 5, wherein
the defect is a solder protruding defect in which solder protrudes from a tip of the lead of the circuit component in soldering the lead to the circuit board.

7. A defect inspection method using an appearance inspection device comprising:
an imaging unit configured to capture an image of an inspection region on an inspection target;
a height measurement unit configured to emit measurement light and receive reflected light of the measurement light to measure a height of a predetermined place in the inspection target; and
a moving mechanism configured to relatively move the imaging unit, the height measurement unit, and the inspection target to change the inspection region captured by the imaging unit and the predetermined place where the height is measured by the height measurement unit, the method comprising:
determining whether the inspection target has a defect in the inspection region based on an image of the inspection region captured by the imaging unit and information on the height of the predetermined place measured by the height measurement unit; and
restricting determination of whether there is the defect based on the information on the height of the predetermined place measured by the height measurement unit when a predetermined restricted region in the inspection target is irradiated with the measurement light.

8. The defect inspection method according to claim 7, wherein
the inspection target is a circuit board equipped with a circuit component, and
the restricted region comprises a fillet part in which solder forms a slope around a lead of the circuit component soldered to the circuit board.

9. The defect inspection method according to claim 8, wherein
another lead and fillet part adjacent to the lead irradiated with the measurement light exist in a direction in which the height measurement unit is moved relative to the circuit board from the restricted region or in a direction opposite to the direction.

10. The defect inspection method according to claim 8, wherein
the defect is a solder protruding defect in which solder protrudes from a tip of the lead of the circuit component in soldering the lead to the circuit board.

11. The defect inspection method according to claim 7, wherein
the inspection target is a circuit board equipped with a circuit component, and
the restricted region comprises a region irradiated with the measurement light immediately before or immediately after a time point at which a lead of the circuit component soldered to the circuit board is irradiated with the measurement light when the height measurement unit and the circuit board are moved relative to each other.

\* \* \* \* \*